United States Patent [19]

Tsai

[11] Patent Number: 4,463,733

[45] Date of Patent: Aug. 7, 1984

[54] CLOSED LOOP FUEL INJECTION TIMING CONTROL

[75] Inventor: Edward S. Tsai, Hudson, Iowa

[73] Assignee: Deere & Company, Moline, Ill.

[21] Appl. No.: 466,444

[22] Filed: Feb. 15, 1983

[51] Int. Cl.$^3$ .................. F02M 39/00; F02D 1/04
[52] U.S. Cl. ............................... 123/501; 123/357; 123/426; 123/425
[58] Field of Search .............. 123/501, 502, 435, 357, 123/426

[56] References Cited

U.S. PATENT DOCUMENTS

| | | | |
|---|---|---|---|
| 3,875,912 | 4/1975 | Bullo | 123/117 |
| 4,019,478 | 4/1977 | Hobo et al. | 123/139 |
| 4,033,310 | 7/1977 | Nicolls | 123/139 |
| 4,130,097 | 12/1978 | Ford | 123/425 |
| 4,265,200 | 5/1981 | Wessel et al. | 123/501 |
| 4,314,534 | 2/1982 | Nakajima et al. | 123/438 |
| 4,327,688 | 5/1982 | Lowther | 123/435 |
| 4,397,283 | 8/1983 | Komaroff et al. | 123/501 |
| 4,397,285 | 8/1983 | O'Neill | 123/425 |

FOREIGN PATENT DOCUMENTS

| | | | |
|---|---|---|---|
| 55-46073 | 3/1980 | Japan | 123/502 |
| 56-6630 | 1/1981 | Japan | 123/502 |

OTHER PUBLICATIONS

Hosey & Powell, "Closed Loop, Knock Adaptive Spark Timing Control Based on Cylinder Pressure", Mar. 1979, pp. 64–70.

Schweitzer & Collins, "Electronic Spark Timing Control for Motor Vehicles", ASAE Paper 780655, Jun. 1978.

Powell, "Closed Loop Control of Spark Timing", pp. 235–251.

"Using Microwaves", 6m Research Lab, Jan. 1980.

Primary Examiner—Ronald B. Cox

[57] ABSTRACT

A diesel engine control system indirectly controls start-of-combustion timing by controlling fuel injection timing as a function of an error signal derived from desired and sensed start-of-combustion timing.

4 Claims, 3 Drawing Figures

CLOSED LOOP FUEL INJECTION TIMING CONTROL

BACKGROUND OF THE INVENTION

The present invention relates to a fuel injection timing control system for a diesel engine.

The optimization of diesel engine performance requires very accurate control of fuel injection timing. It would be even more desirable to control the timing of the start of combustion (SOC), but SOC can only be controlled indirectly by controlling fuel injection timing. Variations in fuel quality and engine operating conditions influence the ignition delay time between fuel injection turn-on and actual start of combustion. Thus, the ability of open loop fuel injection control systems to accurately control SOC is limited. Closed loop control systems for the control of spark timing in ignition-type (gasoline) engines have been proposed to achieve minimum spark advance for best torque or maximum power under various operating conditions. However, such systems are not suitable for use with a fuel-injected diesel engine.

SUMMARY OF THE INVENTION

An object of the present invention is to provide a fuel injection timing control system which automatically compensates for variations in fuel quality or other engine operating conditions which effect ignition delay time in a diesel engine.

Another object of the present invention is to provide such a control system which is stable and which has fast response time and thus, responds well to engine transients.

Another object of the present invention is to provide such a control system with a simple control algorithm.

These and other objects are achieved by the present invention which includes sensors for sensing engine speed, throttle position (load), crank angle and start of combustion. An electronic control unit derives a desired crank angle for start of combustion from the sensed engine speed and load. The actual crank angle for the previous start of combustion is subtracted from the desired crank angle to provide an error value. If the error is larger than a threshold value, then an adjustment value is updated by the error value and an injection crank angle value for energization of a fuel injector is determined from the adjustment value. The injector is turned on when the injection crank angle is reached and then the new start of combustion crank angle value is stored for use in deriving the next error value. In this manner, the start of combustion timing is controlled indirectly by controlling fuel injection timing as a function of an error signal derived from the difference between the actual and desired start of combustion timing. The control system is insensitive to minor, momentary disturbances which cause errors which are less than the threshold value, and the control system automatically compensates for variations in fuel quality or other engine operating conditions which effect ignition delay.

DETAILED DESCRIPTION

Figure 1:
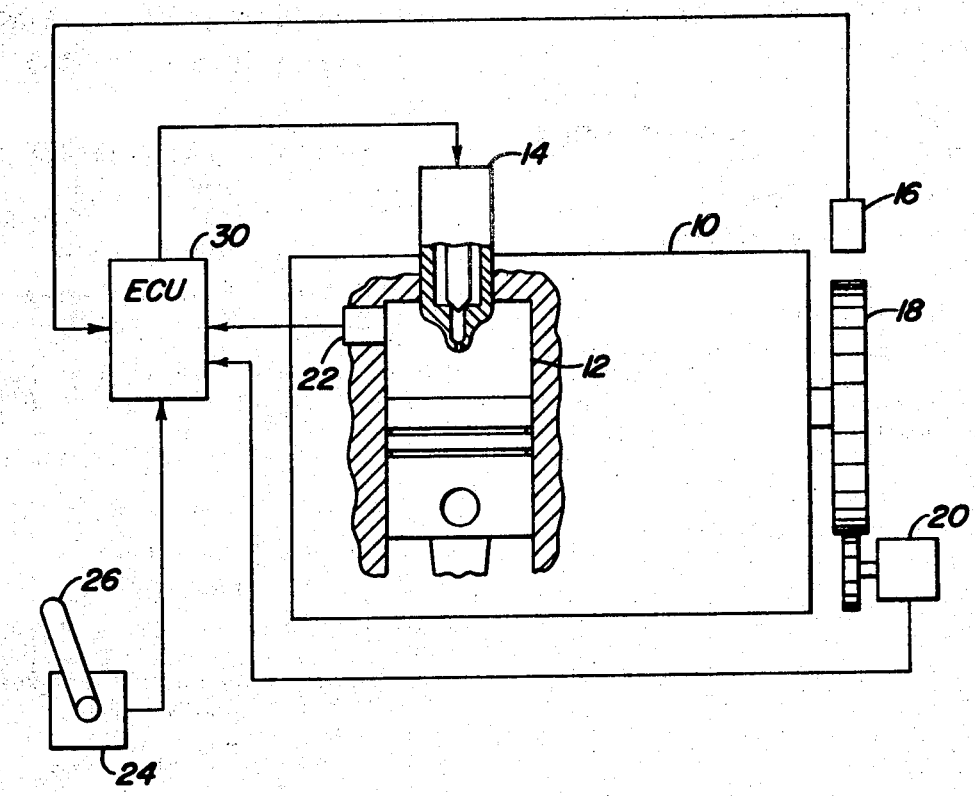
FIG. 1 is a simplified schematic diagram of a diesel engine control system, according to the present invention.

A conventional diesel engine 10 includes a plurality of cylinders 12, (one of which is shown), each with a solenoid-operated fuel injector 14. The control system includes an engine rpm sensor 16, such as a magnetic pick-up, mounted near the engine flywheel 18. A crank angle (CA) sensor 20, such as a conventional encoder, is coupled to the flywheel 18. A combustion detector 22, such as a photo detector, generates a signal in response to radiation generated by combustion in the cylinder 12. A throttle transducer 24 generates a load signal which depends upon the position of the throttle 26.

Figure 2A:
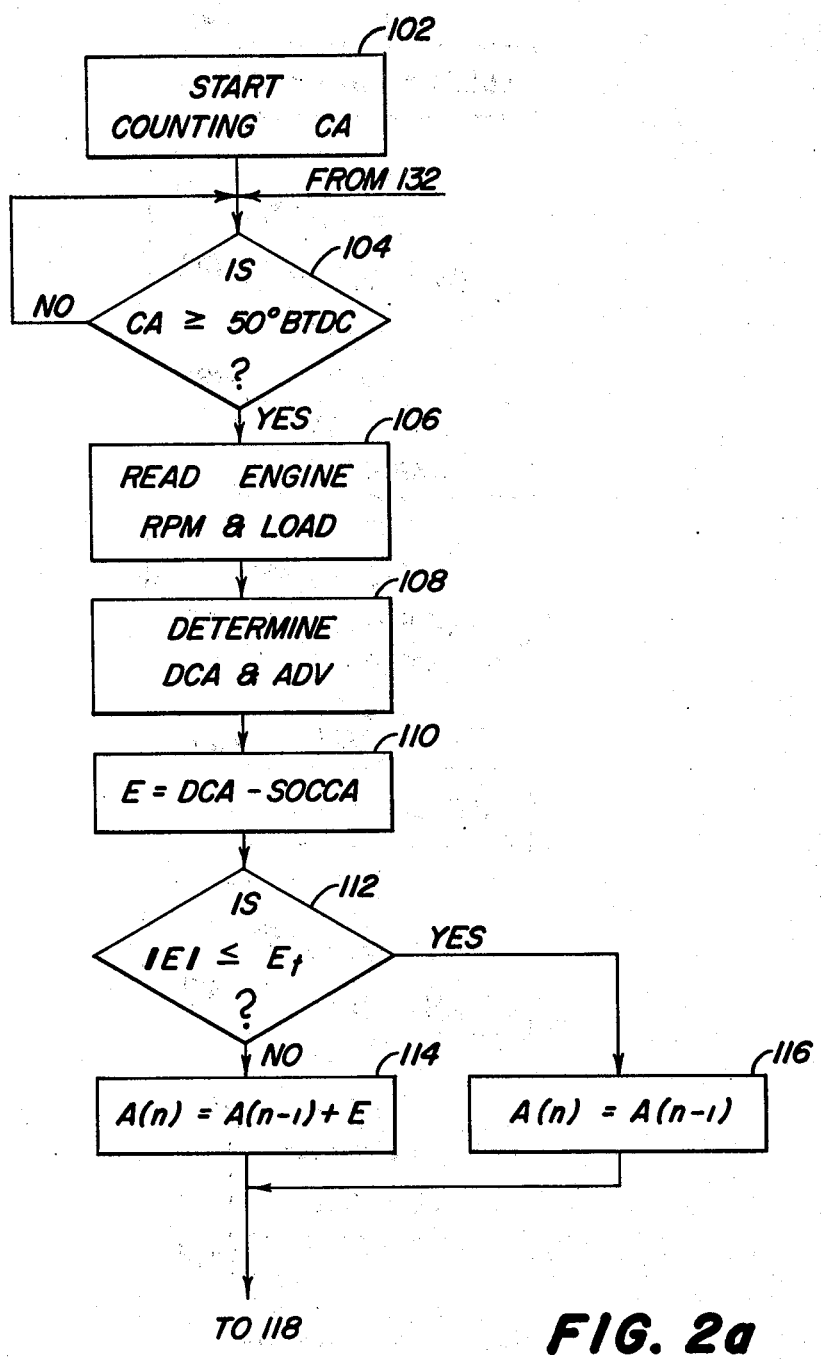
FIGS. 2a and 2b are logic flow diagram of a control algorithm which is executed by the ECU of FIG. 1.
Figure 2B:
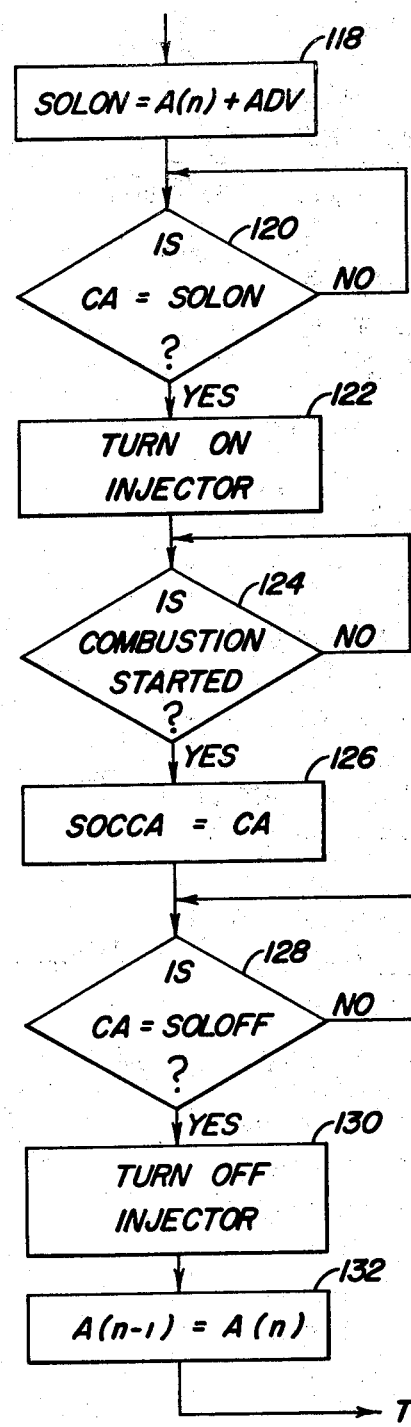

The signals from sensors 16, 20, 22 and 24 are applied to inputs of an electronic control unit 30 (ECU). The control unit 30 preferably would include a conventional microprocessor and associated input and output hardware devices (not shown), such as A/D and D/A converters and multiplexers, for example. The ECU 30 generates control signals which are applied to fuel injector 14 to turn the injector 14 on and off. The injector control signals are generated according to a control algorithm which will now be described with reference to the flow chart shown in FIGS. 2a and 2b.

The control algorithm begins at step 102 by counting the crank angle, CA, derived from encoder 20. Then, step 104 prevents the algorithm from proceeding to step 106 until the CA is equal to or greater than a value such as 50 degrees before top dead center (BTDC). Once this CA is achieved, then the engine rpm and the engine load values from sensors 16 and 24, respectively, are determined.

Then, at 108, a desired crank angle value for start of combustion, DCA, and a delay value, ADV, which represents the crank angle interval between the application of a start injection signal to the injector 14, and the expected start of combustion, are derived using the engine speed and load values from 106 and a schedule which is stored in memory. Such a schedule could be developed empirically by one with ordinary skill in the art and would be similar to such typical injection timing versus speed and load schedules, as are described on page 7 of R. F. Parker's "Future of Fuel Injection System Requirements for Mobile Power", SAE Paper No. 760125, 1976.

Then, in step 110, an error value, E, is calculated by subtracting a SOCCA value, representing the CA at which combustion started during the last injection cycle, from the DCA value. Then, at step 112, the absolute value of the E value is compared to some small threshold value, Et, which represents a magnitude of error values below which the error value, E, can be ignored, for example, $\frac{1}{8}$ to $\frac{1}{2}$ degrees. If the magnitude of E is less than or equal to Et, then an "nth" correction value A(n) is set equal to the previous value, A(n−1) in step 116. (A(o) is initially set equal to 0). However, if the magnitude of E is greater than Et, then A(n) is set equal to A(n−1)+E in step 114.

Next, at 118, a SOLON value, representing the crank angle corresponding to when a signal should be applied to the injector 14, is set equal to A(n)+ADV. Then, step 120 prevents the injector 14 from being turned on in step 122 unless the crank angle, CA, is equal to the crank angle represented by the SOLON value from step 118. After the injector is turned on, step 124 prevents the algorithm from proceeding to step 126 until combustion has begun, as determined by the signal from combustion sensor 22. In step 126, the crank angle at which combustion began is stored as the new SOCCA value. In this manner, the new solenoid turn on crank angle value, SOLON, is adjusted by an amount which is proportional to difference or error, E, plus the accumulated previous errors between the desired start of combustion crank angle, DCA, and the actual previous start of combustion crank angle, SOCCA.

Steps 128 and 130 operate to turn off the fuel injector solenoid when the crank angle is equal to SOLOFF, which is preferably a crank angle value corresponding to a most retracted position of the plunger of the fuel injector, such that the injector will be turned on for an appropriate duration. After the injector is turned off at 130, the previous correction value, $A(n-1)$, is set equal to the current correction value, $A(n)$, at 132, after which the algorithm returns to step 104.

The conversion of the above-described flow chart into a standard language for implementing the algorithm described by the flow chart in a digital data processor, such as a microprocessor, will be evident to those with ordinary skill in the art.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

I claim:

1. A method for controlling cylinder fuel injection timing of a fuel-injected diesel engine with a control system having an engine speed sensor, a combustion sensor, a crankshaft angle sensor and a load signal generator, the method comprising the steps of:
   (a) setting an actual start of combustion timing value, SOCCA, representing the crank angle corresponding to a start of combustion in a cylinder sensed by the combustion sensor;
   (b) determining a desired start of combustion crank angle value, DCA, derived from sensed engine speed, the engine load signal and from a stored schedule;
   (c) determining a delay value, ADV, representing an expected time delay between application of a start injection signal to a fuel injector of the engine and start of combustion of the injected fuel;
   (d) deriving a combustion timing error value, E, by subtracting SOCCA from DCA;
   (e) setting a current accumulated error value, $A(n)$, equal to the sum of a predetermined accumulated error value, $A(n-1)$, plus the combustion timing error value, E, if the magnitude of E exceeds a predetermined threshold, Et;
   (f) deriving an injection start timing value, SOLON, from the delay value ADV and the current accumulated error value $A(n)$;
   (g) starting fuel injection when the crank angle corresponds to SOLON;
   (h) resetting the SOCCA value to the crank angle corresponding to the time that the combustion sensor senses combustion of the fuel injected, as a result of step (g); and
   (i) repeating steps (b) through (h) for each operating cycle of the cylinder.

2. The invention of claim 1, wherein step (e) comprises:
   comparing E to the threshold value, Et, and
      (a) if the absolute value of E is not greater than Et setting the current correction value $A(n)$ equal to the pre-determined correction value $A(n-1)$, or
      (b) if the absolute value of E is greater than Et setting $A(n)$ equal to the sum of $A(n-1)$ and E.

3. The invention of claim 1, wherein the combustion sensor comprises a photo detector sensitive to radiation produced by combustion in a diesel engine cylinder.

4. The invention of claim 1, wherein the load signal generator comprises a transducer for sensing a position of a throttle control of the diesel engine.

* * * * *